United States Patent [19]
Kotsiopoulos et al.

[11] Patent Number: 5,254,379

[45] Date of Patent: Oct. 19, 1993

[54] PAINT BALL

[75] Inventors: Thomas G. Kotsiopoulos, Northfield; Gary E. Gibson, Wheeling, both of Ill.

[73] Assignee: Perfect Circle Paint Ball Inc., Wheeling, Ill.

[21] Appl. No.: 779,826

[22] Filed: Oct. 21, 1991

[51] Int. Cl.$^5$ .............. F42B 8/14; B32B 1/06
[52] U.S. Cl. .................... 428/35.7; 428/34.1; 428/36.92; 428/910; 428/43; 428/321.1; 428/321.5; 428/500; 273/58 R; 273/58 B; 273/58 F; 273/58 H; 273/317; 273/DIG. 2; 273/428; 273/418; 102/501; 102/502; 102/506; 102/513
[58] Field of Search .............. 428/34.1, 35.7, 36.92, 428/43, 64. 152, 155, 163, 167, 220, 321.1, 321.3, 321.5, 327, 337, 500, 910; 273/58 R, 58 B, 58 F, 58 H, 58 K, 317. DIG. 2, 428, 418; 102/501, 502, 506, 513

[56] References Cited

U.S. PATENT DOCUMENTS

| | | | |
|---|---|---|---|
| 2,925,276 | 2/1960 | LeClerc | 273/106 |
| 3,649,020 | 3/1972 | Hall | 273/106 E |
| 4,634,606 | 1/1987 | Skogg | 427/256 |
| 4,656,092 | 4/1987 | Haman et al. | 428/402.2 |
| 4,684,137 | 8/1987 | Armer, Jr. et al. | 273/428 |
| 4,899,660 | 2/1990 | Brighton | 102/447 |
| 4,932,329 | 6/1990 | Logie | 102/498 |
| 4,942,818 | 7/1990 | Saxby | 102/444 |
| 4,944,521 | 7/1990 | Greeno | 273/428 |
| 4,950,516 | 8/1990 | Schwab | 428/36.92 |
| 5,001,880 | 3/1991 | Smith | 53/453 |
| 5,009,165 | 4/1991 | Morris | 273/418 |
| 5,018,449 | 5/1991 | Eidson, II | 102/498 |
| 5,018,450 | 5/1991 | Smith | 273/498 |
| 5,035,183 | 7/1991 | Luxton | 102/502 |

OTHER PUBLICATIONS

11 Encyclopedia of Chemical Technology, Gelatin, pp. 711–718 (Kirk-Othmer 3d Ed.).
21 Encyclopedia of Chemical Technology, Styrene Plastics, pp. 801–842 (Kirk-Othmer 3d Ed.).

*Primary Examiner*—Ellis P. Robinson
*Assistant Examiner*—Charles R. Nold
*Attorney, Agent, or Firm*—Leydig, Voit & Mayer

[57] ABSTRACT

A paint ball including a paint ball shell and an axis extending through the shell to define first and second poles. The paint ball shell fractures in a predetermined pattern upon the receipt of a fracturing force to form fracture lines from the point of impact circumferentially toward the first pole and from the point of impact circumferentially toward the second pole.

25 Claims, 3 Drawing Sheets

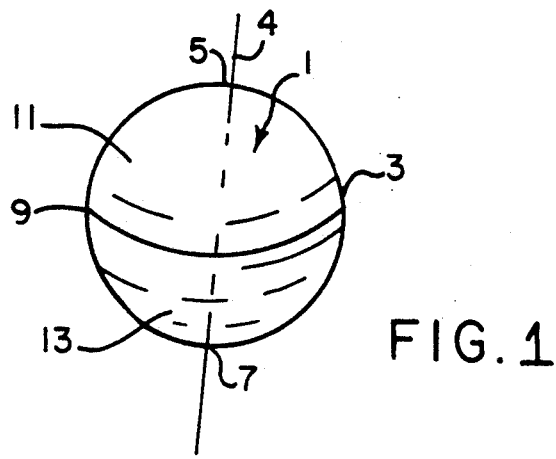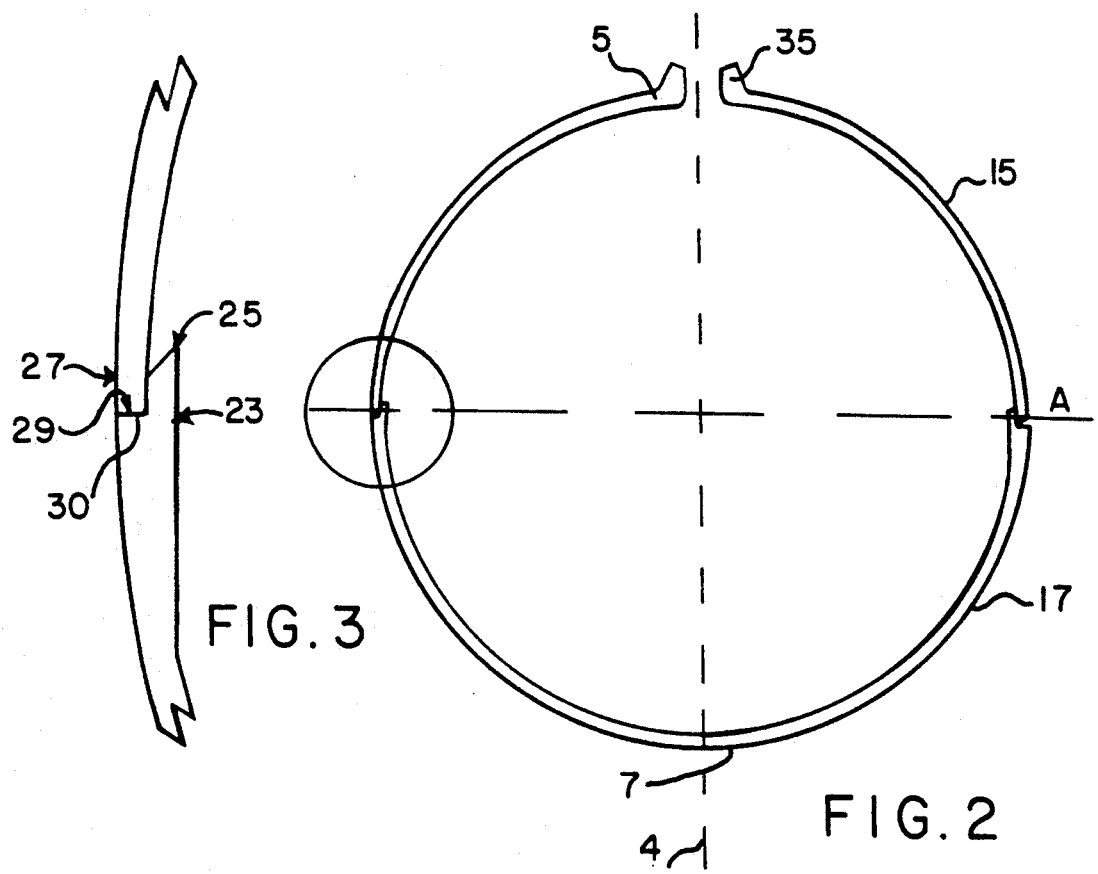

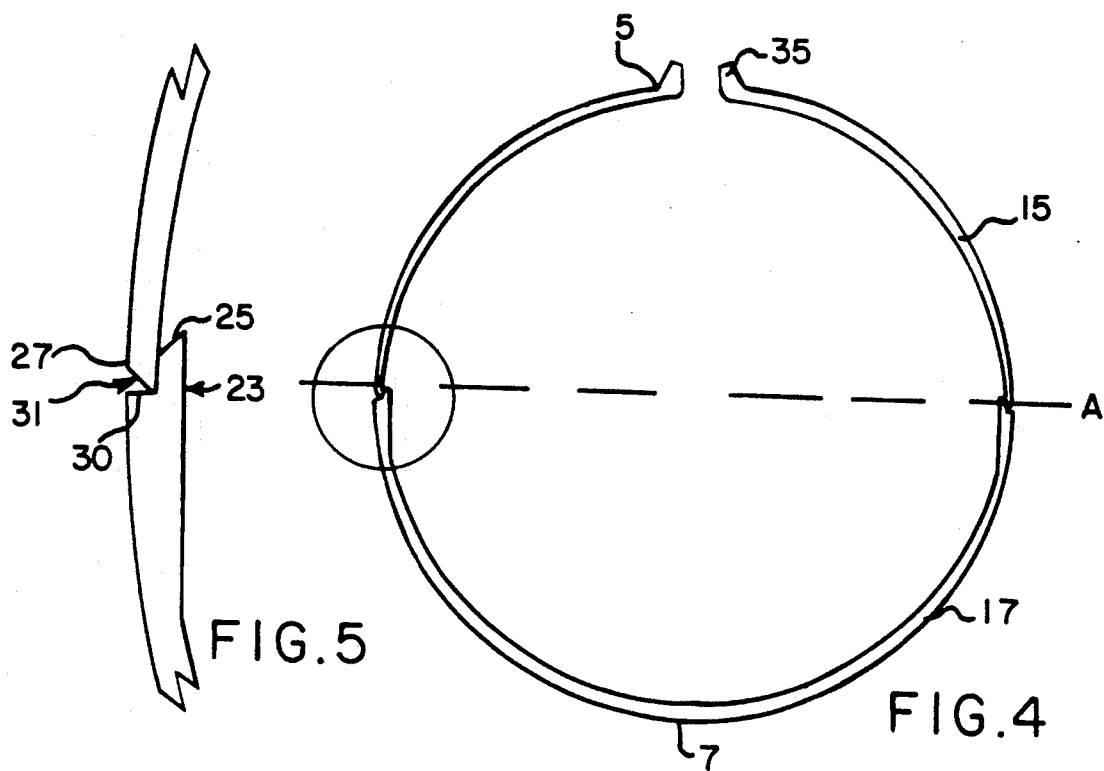
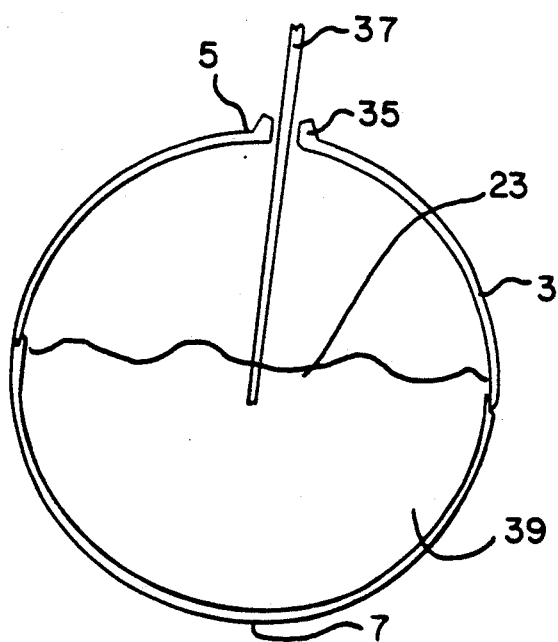

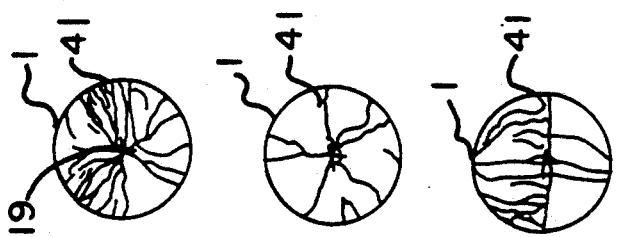
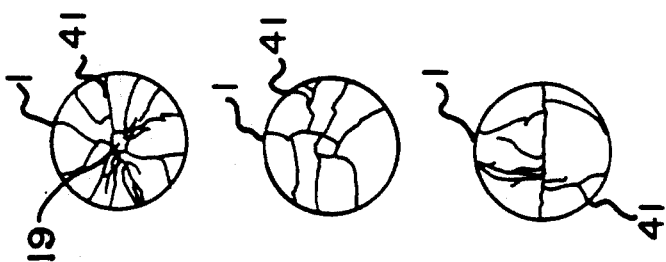
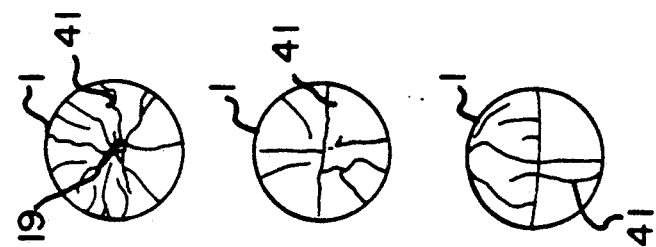
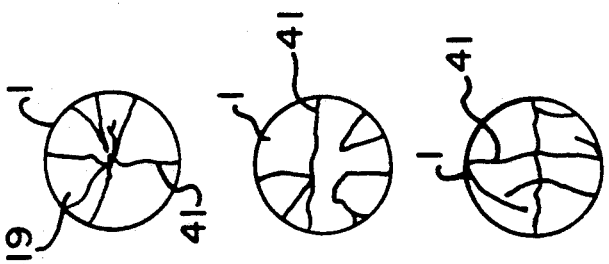
FIG. 7a  FIG. 7b  FIG. 7c

PAINT BALL

FIELD OF INVENTION

The invention relates to fragile projectiles and methods for forming the same which are typically fired by compressed gas guns. More particularly, the invention relates to projectile structures formed by an outer shell that fractures in a predetermined pattern to disperse paint contained therein.

BACKGROUND OF THE INVENTION

Generally, police and military training and mock war games are conducted using compressed gas guns which fire projectiles known as paint balls. The object of this type of warfare is to "hit" a target, usually an opponent, with a paint ball to thereby "kill" the opposing player.

Traditionally, the shell of the paint ball is formed with a pair of hemispheres of gelatinous material similar to that used to encase oral medicines such as cold capsules. As is the case with oral medicines, these gelatin shell paint balls are soluble in water. Upon striking the target, a paint ball that functions as intended fractures to mark the victim with coloring agent contained within the paint ball shell.

While these gelatin shell projectiles are traditionally termed paint balls, the coloring agent within the paint ball shell need not necessarily be a paint. To ensure removal of the colored marks left by the paint balls from the skin and clothes of a victim, the coloring agent should exhibit good skin and fabric fugitivity. To this end, water soluble vegetable dyes are often used as coloring agents. Pigments are often added to increase the opacity of the mark left by the breaking paint ball.

One common difficulty with known gelatin shell paint balls is that vegetable dye colorants are usually dissolved in water, a substance which would dissolve the gelatin based shell of the traditional paint ball. In addition, other components which one would like to place in a paint ball, such as smoke or tear gas are greatly limited by the properties of the gelatin shell.

To combat the difficulties presented by the low water tolerance of gelatin, the common water soluble colorant solution is commonly mixed in a mixture of ethylene glycol and polyethylene glycol, or in propylene glycol, in the form of a viscous gel. The use of ethylene glycol is especially troublesome as it is generally considered a toxic substance and contact with human skin is discouraged. While glycol based colorants prevent destruction of the paint ball shell, known gelatin shell paint balls remain exceedingly vulnerable to the vagaries of the external environment. Rain, sweat from a user's body, and even high humidity often alter or even damage the gelatin shell of the paint ball rendering it inaccurate or in many cases unusable.

Further, while the use of glycol gels inhibit the dissolution of the paint ball shell from within, paint balls using glycols suffer from other problems. Perhaps greatest among these problems is the pliability of the gelatinous shell in combination with the viscous glycol. When a victim is struck by a known paint ball, the gelatinous shell yields and stretches undesirably prior to fracturing. Particularly, the forward portion of the paint ball tends to yield somewhat as it contacts the target. As the ball continues to impinge upon the target and fracture, much of the viscous glycol and colorant mixture is displaced to the still intact rear portion of the gelatin shell. As the rearward, still intact, portion of the gelatin shell, containing the viscous colorant mixture, proceeds to impact the target, a cutting leading edge of the rear portion hemisphere engages the target. When the target is a human, this cutting edge often leaves a marked cut, bruise or welt on the victim's skin.

Known paint balls also suffer from inaccuracy, especially when launched from a distance from the target. These paint balls tend to be slightly out of round due to inherent manufacturing difficulties. Even when precise manufacturing techniques are employed, known gelatin shell paint balls are minimally 0.015" out of round. Even this seemingly small oblong shape impart inaccuracy to the fired paint ball.

Additionally, such out of round character impedes the handling of the paint ball through automatic loaders on rapid fire compressed gas paint ball guns. An added difficulty with gelatin paint balls is that the balls often have a very fine seam where the two halves of the gelatin shell have been joined. Because of the delicate nature and inability to withstand exposure to water, this seam cannot readily be removed and further contributes to the inaccuracy of the gelatin shell paint ball when fired.

Further, gelatin shell paint balls have not provided a sufficient density coupled with the launching power of available compressed gas guns to achieve the firing distance sought by many war game players.

Finally, the manufacturing process for producing gelatin shell paint balls is very time consuming. The entire process, from forming of the shell until the ready to ship finished product is complete often takes four days. This long preparation is also often coupled with a high percentage of rejected paint balls.

SUMMARY OF THE INVENTION

It is therefore a general object of the invention to provide an improved paint ball that overcomes deficiencies of the prior art. One object of the invention is to provide a paint ball which decreases the risk of cutting, bruising or welting the skin of a person struck by such a ball.

Another object of the invention is to provide a paint ball shell which is impervious to water and humidity.

A third objective is to provide a paint ball shell which may be filled with a variety of components.

Still another object of the invention is to provide a paint ball which may be launched greater distances by existing compressed gas guns.

Finally, an object of the invention is to provide a method of manufacturing paint balls which is less time consuming, more convenient, and therefore less expensive.

These and other objects and advantages of the invention will be apparent to those skilled in this art from the following description of the invention and the appended claims.

The present invention is a paint ball including a paint ball shell which is impervious to water and which readily fractures upon striking a victim with a greatly decreased risk of physical harm to the victim.

Structurally, a generally spherical paint ball shell of the invention has an axis of symmetry defining a first pole and a second pole in the paint ball shell. The axis of symmetry is substantially normal to a plane passing through the shell, which, for example, may define an equatorial plane. The paint ball shell defines an interior cavity for encapsulating a coloring agent. The paint ball shell is constructed such that upon application of a force at any impact point on the paint ball shell, sufficient to fracture the paint ball shell, the shell fractures in a pattern having a plurality of fracture lines extending from the impact point toward the first pole and toward the plane and toward the second pole. In this way, the risk of harm or injury from the paint ball is greatly reduced.

The paint ball shell of the invention is preferably comprised of a thermoplastic linear polymer, for example, polystyrene. The linear polymer is preferably molecularly oriented along circumferential lines extending from the first pole toward the equator and along circumferential lines extending from the second pole toward the equator. The paint ball shell of the invention may have a wall thickness of from about 0.005 to about 0.040 inches and preferably from about 0.008 to about 0.015 inches. The paint ball shell of the invention may be formed of a linear polymer blended with an environmentally degradable additive. Usable degradable additives include photo-degradable additives which may be blended with a linear polymer in a ratio of about 75% by weight linear polymer and about 25% photo-degradable additive.

A method of forming a paint ball shell according to the invention includes the steps of injection molding a linear polymer into a first mold forming a first portion having a first apex region and a first edge. The portion is molded such that the linear polymer is molecularly oriented along circumferential lines extending from the first pole to the first portion edge. In a next step, a second portion is formed from a linear polymer injection molded into a second mold. The second portion includes a second apex region and a second edge. As with the first portion, the second portion is molded such that the linear polymer is molecularly oriented along circumferential lines extending from the second pole of the second portion to the second edge. The paint ball shell is then formed by joining the first portion with the second portion in a next step.

A coloring agent may thereafter be dispensed into the paint ball shell through a fill port located at the first apex region. The fill port is thereafter sealed. In a final step, any flashing created during the joining of the first portion to the second portion and during the sealing of the seal port is then removed to provide the paint ball according to the invention.

DESCRIPTION OF THE DRAWINGS

FIG. 1 is a perspective view of an embodiment of a paint ball according to the present invention.

FIG. 2 is a cross-sectional view of a paint ball shell when the portions of the shell are to be joined by ultrasonic welding.

FIG. 3 is an exploded cross-sectional view of the mating portions of the paint ball shell portions when the portions of the shell are to be joined by ultrasonic welding.

FIG. 4 is a cross-sectional view of the paint ball shell when the portions of the shell are to be joined by solvent welding.

FIG. 5 is an exploded cross-sectional view of the mating portions of the paint ball shell portions when the portions of the shell are to be joined by solvent welding.

FIG. 6 is a cross-sectional view of a paint ball shell being filled with coloring agent.

FIG. 7a is an array of perspectives views, looking from a first pole and from the point of impact breakage configurations for increasing impacting forces to the paint ball of the invention.

FIG. 7b is an array of perspectives of breakage configurations of paint ball of FIG. 7a, looking at an opposite pole from the impact point.

FIG. 7c is an array of perspectives of breakage configurations of the paint ball of FIGS. 7a and 7b with the impact point at the north pole of the perspective.

DETAILED DESCRIPTION

Referring generally to the above figures wherein like numerals indicate like parts, a new generally spherical paint ball 1, a new paint ball shell 3, a new method for making the new paint ball 1 and a new method for making a new paint ball shell 3 have been discovered. Following studies of the fracture patterns of known gelatin paint balls, it has been discovered that a paint ball shell whose breakage pattern can be controlled results in an improved breakage pattern which lessens the risk of injury to a victim struck by the paint ball. Further, this improved paint ball shell 3 and paint ball 1 constructed using such a shell exhibit other characteristics which constitute great improvements over known paint ball shells and paint balls.

FIG. 1 shows a paint ball having a generally spherical, hollow paint ball shell 3 formed from a pair of complimentary hemisphere portions 11 and 13. An axis 4 extends through the paint ball to define a first pole 5 and a second pole 7. When together, the edges of the hemisphere portions 11, 13 define an equator 9. As best seen in FIG. 2, the paint ball shell 3 includes an exterior wall 8 and an interior wall 10 which forms an interior cavity when the hemispheric portions are joined with each other. According to the invention, the paint ball shell 3 reacts to an application of a force impacting at any point on the paint ball shell sufficient to fracture the paint ball. The paint ball shell 3 yields along fracture lines 41 (see FIGS. 7a–c). The fracture lines radiate generally linearly and circumferentially from the impact point 19 toward the nearest pole and toward the equator 9. The fracture lines also extend through the farthest pole. This arrangement greatly reduces the chances of injury to a victim struck by the paint ball 1.

When a force sufficient to fracture the paint ball is applied at an impact point 19 in a first hemisphere 11, fracture lines 41 extend generally circumferentially from the impact point 19 toward the first pole 5 and toward the equator 9. If the force is of sufficient magnitude, the fracture lines 41 extend through the equator 9 and toward and possibly through the second pole 7. Likewise, when the impact point 19 is received in the second hemisphere 13, fracture lines radiate generally circumferentially from the impact point 19 toward and through the second pole 7 and onward toward the equator 9. In addition, fracture lines extend toward and through the equator 9 and toward and possibly through the first pole 5.

The paint ball shell 3 of the invention is preferably fabricated from linear polymers, for example, from a thermoplastic linear polymer. The thermoplastic linear polymer is preferably a brittle linear polymer such as polystyrene, an easily moldable, commercially available, and relatively inexpensive polymer. One suitable polystyrene for use in the invention is POLYSTAR ™, a polystyrene, distributed by Rexene Corporation.

Various advantages flow readily from the construction of the paint ball shell 3 from a linear polymer. First, the polymer shell 3 is impervious to water and does not dissolve when contacted by rain or sweat or when placed in a warm humid environment. This impervious nature allows the shell to be used to contain a variety of products such as water based paints and dyes, smoke, tear gas and other items unsuitable for placement in known gelatin shells.

Additionally, linear polymers are more readily handled and molded into a more perfectly round paint ball shell 3 than is achievable with known gelatin paint ball shells. Accordingly, the paint ball shell 3 may be constructed within a tolerance of less than 0.002 inches out of round. In this way, use of a linear polymer permits rapid loading and launching of the ball and greater launch distances are achieved while still yielding superior breakage properties. A paint ball 1 constructed using the paint ball shell 3 manufactured from a linear polymer also exhibits superior spread of the colorant contained within the paint ball when compared to the colorant spread from a known gelatin shelled paint ball.

The paint ball shell 3 of the invention constructed from linear polymer such as polystyrene exhibits the desired breakage characteristics when constructed with a wall thickness of from about 0.005 to about 0.040 inches. Even more preferably, this wall thickness is controlled to a range of from about 0.008 to about 0.015 inches.

To lessen the environmental impact of pieces of broken paint ball shell falling on the ground during mock war games, the linear polymer used to form the paint ball shell 3 may be blended with an environmentally degradable additive. In blending an environmentally degradable additive with the linear polymer, the larger broken pieces of the paint ball shell 3 will degrade into minute particle portions of polystyrene rather than leaving larger plastic pieces of the paint ball shell 3 lying on the ground.

Suitable environmentally degradable additives include photo-degradable and biodegradable additives. One suitable photo-degradable ingredient which achieves the desired result is Ecolyte ™ distributed by Ecolyte Corporation. While various mixtures of linear polymer and degradable additive are suitable for use in the invention, a mixture of about 75% by weight linear polymer, preferably polystyrene, and about 25% by weight photo-degradable additive, preferably ECOLYTE ™, a photo-degradable polystyrene additive, works particularly well.

As seen in FIGS. 2-5, a paint ball shell 3 of the subject invention may be constructed from a first portion 15 and a second portion 17. Preferably, the first portion 15 and the second portion 17 each form a hemisphere 11, 13 of a completed paint ball shell 3. By constructing the first and second portions 15, 17 as a hemisphere of the paint ball shell, maximum improved breakage properties are achieved.

The first portion 15 is so constructed that the portion forms an apex region 5 (identical to the first pole 5), a plane A along the edge 27 located at the maximum diameter of the first portion 15, a first interior wall and a first exterior wall. The second portion 17 is also constructed such that it has a second edge 23 along the maximum diameter of the second portion 17, an apex region 7 (identical to the second pole 7), a second interior wall and a second exterior wall.

A paint ball shell 3 of the subject invention constructed from a first portion 15 and a second portion 17 more readily develops fracture lines 41 in the paint ball shell portions 15, 17 which radiate generally circumferentially from the impact point 19 toward and through the nearest pole and toward the nearest edge, across the nearest edge and toward and sometimes through the farthest pole when impacting a target.

When the first portion 15 and the second portion 17 are each a hemisphere of the completed paint ball shell 3, the first and second edges 23, 27 form the equator 9 of the paint ball shell 3. Upon a paint ball of the invention striking a target, a force impact point 19 in one of the hemispheres causes fracture lines 41 radiating generally circumferentially and linearly from the impact point 19 toward and through the nearest pole and onward toward the equator 9. Such fracture lines 41 would also radiate generally circumferentially toward and through the equator 9 and toward and possibly through the most distant pole.

Fracture lines 41 allow for the complete breakage of paint ball 1 upon impacting a target and greatly lessen the potential for injury to the victim struck by the ball. The cutting injuries caused by the still intact gelatin paint ball hemisphere after breakage of the leading hemisphere are greatly reduced and bruising injuries are notably reduced by the subject invention.

Further, either the first portion 15 or the second portion 17 may contain a fill port 35 for filling the paint ball shell 3 with a suitable fill such as a coloring agent.

The paint ball shell portions 15, 17 may be constructed from a linear polymer thus overcoming several disadvantages of known gelatin paint ball shells. Preferably, the linear polymer is a brittle linear polymer such as polystyrene.

The paint ball shell portions 15, 17 of the invention attain the maximum improvement in breakage patterns when constructed of a linear polymer which is molecularly oriented along circumferential lines extending from the first apex region 5 toward the first edge 27 of the first portion 15 and which is also molecularly oriented along circumferential lines extending from the second apex region 7 toward the second edge 23.

The paint ball shell 3 of the invention constructed from linear polymer such as polystyrene exhibits the desired breakage characteristics when constructed with a wall thickness of from about 0.005 to about 0.040 inches. Even more preferably, this wall thickness controlled to a range of from about 0.008 to about0.015 inches.

As previously discussed, the linear polymer used to form the paint ball shell 3 may be blended with environmentally degradable additives such as photo-degradable and biodegradable additives. A suitable photo-degradable additive is ECOLYTE ™, a photo-degradable polystyrene additive, distributed by Ecolyte Corporation. Again, various mixtures of linear polymer and degradable additive are suitable for use in the invention. A mixture of about 75% by weight linear polymer, preferably polystyrene, and about 25% by weight photo-degradable additive, preferably ECOLYTE ™, a photo-degradable polystyrene additive, works particularly well.

As seen in FIG. 6, a paint ball 1 of the subject invention may be formed using a paint ball shell 3 having a first portion 15 and a second portion 17 by filling the hollow cavity of the paint ball shell 3 formed by the interior walls of the joined first and second portions 15, 17 with a suitable coloring agent. One such suitable coloring agent is a water soluble dye dispersed in water. Such a dye may be readily washed from the skin and clothing of a victim struck by a paint ball 1 of the invention.

Additionally, the coloring agent placed within the paint ball 1 may contain a finely dispersed weighting agent. Suitable weighting agents include a fine dispersion of calcium carbonate and a fine dispersion of barium sulfate. These finely dispersed weighting agents will remain in suspension in the coloring agent and should not impart any wobble to a launched paint ball. A paint ball using such weighting agents may be constructed at a standard paint ball size and achieve a greater launching distance. Also, a smaller paint ball, using less construction materials, may be formed using weighting agents and that paint ball may attain launching distances equal to that of larger non-weighted paint balls. The launching range of paint balls using weighting agents must be balanced against an increased likelihood of injury should a person be struck by a paint ball having an increased density.

Finally, a paint ball shell 3 of the invention may be fill with other suitable components such as tear gas for use in paint ball guns.

In another embodiment of the present invention, a plurality of grooves are etched in the interior side of the paint ball shell. Preferably, eight grooves may be found. Four of these grooves are be spaced 90° apart and radiate generally circumferentially and linearly from the first pole 5 to the equator 9. The remaining four grooves are spaced 90° apart and radiate generally circumferentially and linearly from the second pole 7 to the equator 9.

A spherical paint ball shell 3 may be formed from a linear polymer in several ways including injection molding and blow molding. However, the preferable method of forming the paint ball shell 3 of the invention is by injection molding of a linear thermoplastic polymer. In injection molding, the thermoplastic polymer is heated and then injected under high pressures into a mold. Using injection molding, the spherical paint ball shell wall may have a thinner, more uniform wall structure.

To injection mold a generally spherical paint ball shell 3, the sphere is most easily formed in a first portion 15 which forms a first apex region 5, a plane A along the edge 27 located at the maximum diameter of the first portion 15, a first interior wall and a first exterior wall and a second portion 17 which forms a second edge 23 along the maximum diameter of the second portion 17, a second apex region 7, a second interior wall and a second exterior wall, first portion 15 and a second portion 17. Also, molding of a fill port 35 in the first portion 15 is desirable. The first and second portions 15, 17, after being formed by injection molding, are then joined to form the completed paint ball shell 3.

The first and second portions 15, 17 are preferably a hemisphere of a spherical paint ball shell. By molding the first and second portions 15, 17 as hemispheres, the length of the fracture lines 41 which are induced in the first and second portions 15, 17 upon impacting a victim are minimized resulting in the most desirable breakage properties of the paint ball shell 3. In addition, constructing each of the first and second portions 15, 17 as hemispheres improves handling and processing of the first and second portions during the molding and construction process.

The plastic art has long known that when using linear polymers to create thin walled objects, care must be taken or the object created may be broken easily. This tendency to break is increased when a brittle linear polymer such as polystyrene is used. Study has found that when linear polymers are rapidly injected into cool, thin walled molds, the molded article often lacks suitable strength and the art has warned away from molding such articles.

However, in the case of a paint ball shell 3, rapid and complete breakage of the shell 3 upon striking a target is a desirable property. A discovery of the invention is that when a linear polymer, and especially a brittle linear polymer such as polystyrene, is injected into a thin walled mold to form the paint ball shell first portion 15 and second portion 17, the resulting paint ball shell 3 made by joining the paint ball shell portions 15, 17 exhibits the property of rapid and complete breakage upon impacting a target.

This breakage property is imparted by the molecular orientation of the linear polymer achieved during the molding of the paint ball shell portions 15, 17. By injecting the linear polymer into the mold at the apex regions 5, 7 of the paint ball shell portions 15, 17 and pushing the linear polymer through the mold to the outer edge of the paint ball shell portion, a process called center gating, the linear polymer is encouraged to molecularly orient circumferentially along a line leading from the apex regions 5, 7 of the paint ball shell portions 15, 17 to the outer edge of the paint ball shell portions.

The ability to achieve molecular orientation may be further improved by injecting the molten plastic into a relatively cool mold. A paint ball shell portion of the invention is preferably molded with the linear polymer at an injection temperature of about 450° F. and with the mold held at a temperature of about 70° to 80° F.

In injection molding the first portion 15 of a paint ball shell 3, the first portion 15 is preferably molded such that one hemisphere of a paint ball shell 3 is formed with a fill port 35 and a first edge 27. The fill port 35 is preferably formed at the apex region 5 of the first portion 15. The fill port 35 extends outward in a volcano shape from the first portion 15.

As seen in FIGS. 3 and 5, the first edge 27 of the first portion 15 is formed to present a first square flat face 29 when the first portion 15 is to be joined to a second portion 17 by solvent welding. The first edge 27 of the first portion presents an angular face 31 when the first portion 15 is to be joined to a second portion 17 by ultrasonic welding.

In injection molding the second portion 17 of a paint ball shell 3, the second portion 17 is again preferably molded such that one hemisphere of a paint ball shell 3 is formed. As seen in FIGS. 3 and 5, the second portion 17 is molded such that the second edge 23 presents a stepped face comprising a second square flat face 30 and an elongated beveled edge 25 whether the second portion 17 is to be joined to the first portion 15 by solvent welding or by ultrasonic welding.

The first portion 15 is then joined to the second portion 17 to form the paint ball shell 3. When the first portion 15 is to be joined to the second portion 17 by solvent welding, a suitable welding solvent is placed upon the first edge 27 and the second edge 23. The first edge 27 is mated to the second edge 23 such that the first square flat face 29 engages the second square flat face 30 and the elongated beveled edge 25 aligns with the interior of the first portion 15.

When the first portion 15 is to be joined to the second portion 17 by ultrasonic welding, the first edge 27 is mated to the second edge 23 such that the angular face 31 engages the second square flat face 30 and the elongated beveled edge 25 aligns with the interior of the first portion 15. The combined first and second portions are then fitted into an ultrasonic welding horn and welding. Preferably, this ultrasonic welding horn will encompass one of the portions 15, 17, the first edge 27 and the second edge 23, and a percentage of the remaining portion. Obvious to those skilled in the art is that the edges 23, 27 and accompanying end face configurations may be interchanged.

Preferably, upon joining the first portion 15 with the second portion 17, the resulting paint ball shell 3 is no greater than 0.002 inches out of round. Additionally, the first portion 15, the second portion 17 and the resulting paint ball shell 3 preferably has a thickness between the interior wall and the exterior wall of from about 0.005 to about 0.040 inches. Even more preferably, this wall thickness is controlled to a range of from about 0.008 to about 0.015 inches.

Again, in an effort to lessen the environmental impact of pieces of broken paint ball shell falling on the ground during mock war games, the linear polymer, preferably polystyrene, used to form the first portion 15 and the second portion 17 may be blended with an environmentally degradable additive such as a photo-degradable or biodegradable additive. A suitable photo-degradable additive is ECOLYTE TM, a photo-degradable polystyrene additive, distributed by Ecolyte Corporation and a preferable blend is a mixture of about 75% by weight polystyrene and about 25% by weight ECOLYTE TM works particularly well.

As seen in FIG. 6, a paint ball 1 of the invention is prepared by inserting an injection needle 37 into the fill port 35 and a coloring agent, such as a vegetable dye dissolved in water is injected into the paint ball shell. After withdrawing the injection needle, a heat needle is applied to the fill port 35 thus sealing the paint ball shell 3. This seal is best effected when the resulting seal thickness is identical to the general thickness of the paint ball shell 3. The filled and sealed ball should then have any flashing caused by the joining of the first portion 15 to the second portion 17 and the sealing of the fill port 35 removed.

While only certain embodiments have been set forth, alternative embodiments and various modifications will be apparent to those skilled in the art. These and other alternatives are considered equivalents and within the spirit and scope of the present invention.

What is claimed is:

1. A paint ball shell comprising a generally spherical shell member having an interior surface and an exterior surface defining a wall thickness, and having an axis of symmetry defining a first pole and a second pole in the paint ball shell, said axis of symmetry being substantially normal to a plane passing through said shell member, said shell member comprising a polymer molecularly oriented in said paint ball shell along circumferential lines extending from said first pole to said second pole for developing fracture lines extending from an impact point on said shell member toward said first pole and from said impact point toward said second pole upon the application of fracturing forces at said impact point.

2. The paint ball shell according to claim 1, wherein said polymer is a linear polymer.

3. The paint ball shell according to claim 2, wherein said linear polymer is polystyrene.

4. The paint ball shell according to claim 1, wherein said linear polymer is blended with an environmentally degradable additive.

5. The point ball shell according to claim 4, wherein said degradable additive is a photo-degradable additive.

6. The paint ball shell according to claim 5, wherein said linear polymer is blended with said photo-degradable additive in a ratio of about 75% by weight linear polymer and about 25% photo-degradable additive.

7. The paint ball shell according to claim 1, wherein said paint ball shell member has a wall thickness of from about 0.005 to about 0.040 inches.

8. The paint ball shell according to claim 7, wherein said paint ball shell member has a wall thickness of from about 0.008 to about 0.015 inches.

9. The paint ball shell according to claim 1, wherein a plurality of grooves are etched in said interior wall, each of said grooves spaced 90° apart and radiating generally circumferentially from said first pole to said second pole.

10. A paint ball comprising:
    (a) a generally spherical paint ball shell having an interior surface and an exterior surface defining a wall thickness, and having an axis of symmetry defining a first pole and a second pole in the paint ball shell, said axis of symmetry being substantially normal to a plane passing through said shell member, said paint ball shell interior surface defining an interior cavity;
    (b) a coloring agent contained within said interior cavity;
said paint ball shell comprising a polymer being molecularly oriented in said paint ball shell along circumferential lines extending from said first pole to said second pole for developing fracture lines extending from an impact point on said exterior wall toward said first pole and from said impact point toward said second pole upon the application of a force at said impact point sufficient to fracture said paint ball shell to thereby disperse said coloring agent.

11. The paint ball according to claim 10, wherein said polymer is a linear polymer.

12. The paint ball according to claim 11, wherein said linear polymer is polystyrene.

13. The paint ball shell according to claim 11, wherein said linear polymer is blended with an environmentally degradable additive.

14. The paint ball shell according to claim 13, wherein said degradable additive is a photo-degradable additive.

15. The paint ball shell according to claim 14, wherein said linear polymer is blended with said photo-degradable additive in a ratio of about 75% by weight linear polymer and about 25% photo-degradable additive.

16. The paint ball shell according to claim 10, wherein said paint ball shell member has a wall thickness of from about 0.005 to about 0.040 inches.

17. The paint ball shell according to claim 16, where said paint ball shell member has a wall thickness of from about 0.008 to 0.015 inches.

18. The paint ball shell according to claim 10, wherein a plurality of grooves are etched in said interior surface, each of said grooves spaced 90° apart and radiating generally circumferentially said first pole to said second pole.

19. The paint ball according to claim 10, wherein said coloring agent comprises a water soluble dye dispersed in water.

20. The paint ball according to claim 19, wherein said coloring agent includes a finely dispersed weighting agent.

21. The paint ball according to claim 20, wherein said finely dispersed weighting agent is a fine dispersion of calcium carbonate.

22. The paint ball according to claim 20, wherein said finely dispersed weighting agent is a fine dispersion of barium sulfate.

23. A paint ball comprising:
(a) a generally spherical paint ball shell having an interior surface and an exterior surface defining a wall thickness, and having an axis of symmetry defining a first pole and a second pole in the paint ball shell, said axis of symmetry being substantially normal to a plane passing through said shell member, said interior surface defining an interior cavity;
(b) an eye irritant contained within said interior cavity;
said paint ball shell comprising a linear polymer being molecularly oriented in said paint ball shell along circumferential lines extending from said first pole to said second pole.

24. A paint ball shell comprising a first hemispheric portion defined by first edge and terminating at a first apex region and having a first interior surface and a first exterior surface defining a first wall thickness, and a second hemispheric portion defined by a second edge and terminating at a second apex region and having a second interior surface and a second exterior surface defining a second wall thickness, and first portion and said second portion joined at said first and second edges, said paint ball shell comprising a polymer molecularly oriented in said first hemispheric portion along circumferential lines extending from said first apex region to said first edge and said polymer being molecularly oriented in said second hemispheric portion along circumferential lines extending from said second apex region to said second edge.

25. A paint ball comprising:
(a) a first hemispheric shell portion defined by a first edge and terminating at a first apex region and having a first interior surface and a first exterior surface defining a first wall thickness, said first portion composed of a linear polymer, said linear polymer being molecularly oriented in said first portion along circumferential lines extending from said first apex region to said first edge;
(b) a second hemispheric shell portion defined by a second edge and terminating at a second apex region and having a second interior surface and a second exterior surface defining a second wall thickness, said second portion composed of a linear polymer, said linear polymer being molecularly oriented in said second portion along circumferential lines extending from said second apex region to said second edge;
(c) said first and said second shell portions having a first and second wall thickness of from about 0.008 to about 0.015 inches;
(d) said first and second edges joined to form a paint ball shell with a cavity therein; and
(e) contained within said cavity a coloring agent.

* * * * *